(12) United States Patent
Lehtonen

(10) Patent No.: US 7,398,683 B2
(45) Date of Patent: *Jul. 15, 2008

(54) CAPACITIVE ACCELERATION SENSOR

(75) Inventor: Tuomo Lehtonen, Helsinki (FI)

(73) Assignee: VTI Technologies Oy, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/774,691

(22) Filed: Feb. 10, 2004

(65) Prior Publication Data

US 2004/0216523 A1  Nov. 4, 2004

(30) Foreign Application Priority Data

Feb. 11, 2003  (FI)  .................................. 20030207

(51) Int. Cl.
    *G01P 15/125* (2006.01)
(52) U.S. Cl. .................................. 73/514.32
(58) Field of Classification Search ............... 73/514.32
    See application file for complete search history.

(56) References Cited

U.S. PATENT DOCUMENTS

| 4,483,194 A | 11/1984 | Rudolf |
| 4,736,629 A * | 4/1988 | Cole ........................ 73/514.32 |
| 5,065,628 A | 11/1991 | Benecke |
| 5,095,762 A * | 3/1992 | Holm-Kennedy et al. 73/514.32 |
| 5,723,790 A * | 3/1998 | Andersson ................ 73/514.36 |
| 5,831,164 A | 11/1998 | Reddi et al. |
| 5,892,154 A | 4/1999 | Negoro |
| 5,900,550 A * | 5/1999 | Menzel ..................... 73/514.32 |
| 6,000,287 A | 12/1999 | Menzel |
| 6,082,197 A | 7/2000 | Mizuno et al. |
| 6,122,965 A | 9/2000 | Seidel et al. |
| 6,829,937 B2 * | 12/2004 | Mahon ..................... 73/514.32 |
| 6,862,795 B2 * | 3/2005 | Mahon ....................... 73/14.32 |

FOREIGN PATENT DOCUMENTS

DE  195 47 642 A1  6/1996

OTHER PUBLICATIONS

English Translation of Patent Abstract and Claim 1 of DE 195 47 642 A1 published Jun. 27, 1996.

* cited by examiner

*Primary Examiner*—John E Chapman
(74) *Attorney, Agent, or Firm*—Squire, Sanders & Dempsey, LLP

(57) ABSTRACT

The invention relates to measuring devices used in the measurement of acceleration and, more specifically, to capacitive acceleration sensors. The capacitive acceleration sensor according to the present invention contains a movable electrode (5) of the acceleration sensor supported at an axis of rotation (7). Several pairs of electrodes are utilized in the acceleration sensor according to the present invention. Advantages of symmetry are achieved with the acceleration sensor structure according to the present invention, and it enables reliable and efficient measuring of acceleration, in particular in small capacitive acceleration sensor designs.

13 Claims, 7 Drawing Sheets

CAPACITIVE ACCELERATION SENSOR

FIELD OF THE INVENTION

The present invention relates to measuring devices used in the measuring of acceleration, and specifically to capacitive acceleration sensors. An object of the invention is to provide an improved sensor structure, which enables reliable and efficient measuring of acceleration, in particular in small capacitive acceleration sensor designs.

BACKGROUND OF THE INVENTION

Measuring based on a capacitive acceleration sensor has proved to have a simple principle and to provide a reliable method for the measuring of acceleration. The capacitive measuring is based on a change in the gap between two surfaces of a pair of electrodes of the sensor. The capacitance between the surfaces, i.e. the capacity for storing electric charge depends on the area of the surfaces and on the distance between the surfaces. Capacitive measuring can be used already at rather low measuring ranges of acceleration.

The prior art is described below with exemplifying reference to the accompanying figures, of which:

FIG. 1 shows a perspective view of the structure of a pair of electrodes of an acceleration sensor according to prior art, and FIG. 2 shows a side view of the functional structure of a pair of electrodes, based on a translatory motion, of the acceleration sensor according to prior art.

FIG. 1 shows a perspective view of the structure of a pair of electrodes of an acceleration sensor according to prior art. The pair of electrodes of the acceleration sensor according to prior art comprises a movable electrode 1, which moves according to the acceleration, and a stationary electrode 2. The movable electrode 1 is that part 1, which is responsive to the acceleration of the acceleration sensor, and which part, in consequence of the acceleration, moves in relation to the stationary electrode 2. The movable electrode 1 and the stationary electrode 2 constitute a pair of electrodes converting acceleration into a quantity that can be measured electrically, i.e. capacitance. In the figure, the movable electrode 1 of the acceleration sensor is supported at points 3 and 4. Generally, on the opposite side of the movable electrode 1, the acceleration sensor of prior art also comprises a second pair of electrodes, which is not shown in the Figure for clarity reasons.

The acceleration sensor can be implemented based on either a translatory motion or a rotational motion of the movable electrode of the pair of electrodes.

FIG. 2 shows a side view of the functional structure of a pair of electrodes, based on a translatory motion of the acceleration sensor, according to prior art. The pair of electrodes of the acceleration sensor according to prior art comprises a movable electrode 1 and a stationary plate portion 2. The support point of the movable electrode 1 of the acceleration sensor is indicated by point 4. As the movable electrode 1 of the acceleration sensor is in an upper position, a capacitance is formed between the bottom surface of the movable electrode 1 and the top surface of the plate portion 2. The magnitude of the capacitance depends on the area of the surfaces 1, 2 and the distance between the surfaces 1, 2. When the movable electrode 1 of the acceleration sensor moves to a lower position, the capacitance between the surfaces 1, 2 increases considerably, as the distance between the surfaces 1, 2 decreases.

The arrangements for supporting the movable electrode of the pair of electrodes and the structure of the electrodes of an acceleration sensor according to the present invention are described in more detail in the Applicant's co-pending patent application.

SUMMARY OF THE INVENTION

The object of the present invention is to provide such an improved sensor structure, which achieves advantages of symmetry, and which enables reliable and efficient measuring of acceleration in particular in small capacitive acceleration sensor designs.

According to a first feature of the present invention there is provided a capacitive acceleration sensor comprising at least one pair of electrodes, such that each pair of electrodes comprises one movable electrode responsive to the acceleration and at least one stationary plate portion, such that each pair of electrodes further comprises an axis of rotation essentially forming a common axis, such that the movable electrode of the acceleration sensor is rigidly supported at the axis of rotation, such that the movable electrode is free to turn in a rotational motion about the axis of rotation, and that in the acceleration sensor a multitude of pairs of electrodes have been utilized.

Preferably, the locations of the pairs of electrodes are selected symmetrically in relation to axes of symmetry. Preferably, the shape of the electrodes of the pairs of electrodes are chosen to suit the number of pairs of electrodes. Preferably, in the acceleration sensor at least two pairs of electrodes are utilized.

Optionally two pairs of electrodes have been utilized in the acceleration sensor. Preferably, by using two pairs of electrodes, a one axis acceleration sensor has been implemented. Preferably, by using two pairs of electrodes a two axes acceleration sensor has been implemented. Preferably, the pairs of electrodes have been positioned such, that two axes of symmetry are formed. Preferably, the length of the line segment between the centers of gravity of each of the movable electrodes is shorter than the straight line drawn between any support points of different movable electrodes.

Preferably, three pairs of electrodes have been utilized in the acceleration sensor. Preferably, a one axis acceleration sensor has been implemented by using three pairs of electrodes. Alternatively, a two axes acceleration sensor has been implemented by using three pairs of electrodes. Alternatively, a three axes acceleration sensor has been implemented by using three pairs of electrodes. Preferably, the pairs of electrodes have been positioned such, that three axes of symmetry are formed. Preferably, the pairs of electrodes are located in the sensor such, that the angle between the positive direction vector of each movable electrode is 120° and 240° in relation to the positive direction vectors of the other two movable electrodes. Preferably, the negative direction vectors of the movable electrodes intersect essentially at a single point.

Alternatively, four pairs of electrodes are utilized in the acceleration sensor. Preferably, a one axis acceleration sensor has been implemented by using four pairs of electrodes. Alternatively, a two axes acceleration sensor has been implemented by using four pairs of electrodes. Alternatively, a three axes acceleration sensor has been implemented by using four pairs of electrodes. Preferably, the pairs of electrodes are positioned such, that four axes of symmetry are formed.

Preferably, the pairs of electrodes are located in the sensor such, that the angles between the positive direction vector of each movable electrode and the positive direction vectors of the other three movable electrodes are 90°, 180° and 270°.

Preferably, the negative direction vectors of the movable electrodes intersect essentially at a single point.

Alternatively, eight pairs of electrodes are utilized in the acceleration sensor. Preferably, a one axis acceleration sensor has been implemented by using eight pairs of electrodes. Alternatively, a two axes acceleration sensor has been implemented by using eight pairs of electrodes.

Alternatively, a three axes acceleration sensor has been implemented by using eight pairs of electrodes. Preferably, the pairs of electrodes have been positioned such, that four axes of symmetry are formed. Preferably, the various pairs of electrodes have been adapted to measuring at different acceleration ranges. Preferably, some of the pairs of electrodes of the acceleration sensor are redundant pairs of electrodes. Preferably, some of the pairs of electrodes of the acceleration sensor are used for linearisation of the capacitance change.

BRIEF DESCRIPTION OF THE DRAWINGS

The present invention, and preferable methods of implementing it, are described in detail below, with exemplifying reference to the accompanying figures, of which.

Figure 1:
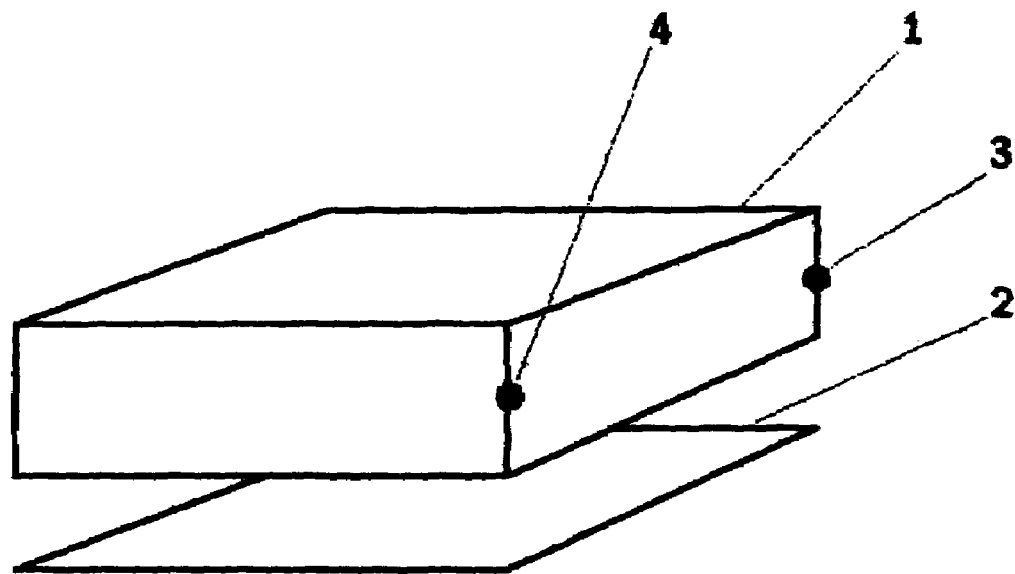
FIG. 1 shows a perspective view of the structure of a pair of electrodes of an acceleration sensor, according to prior art.
Figure 2:
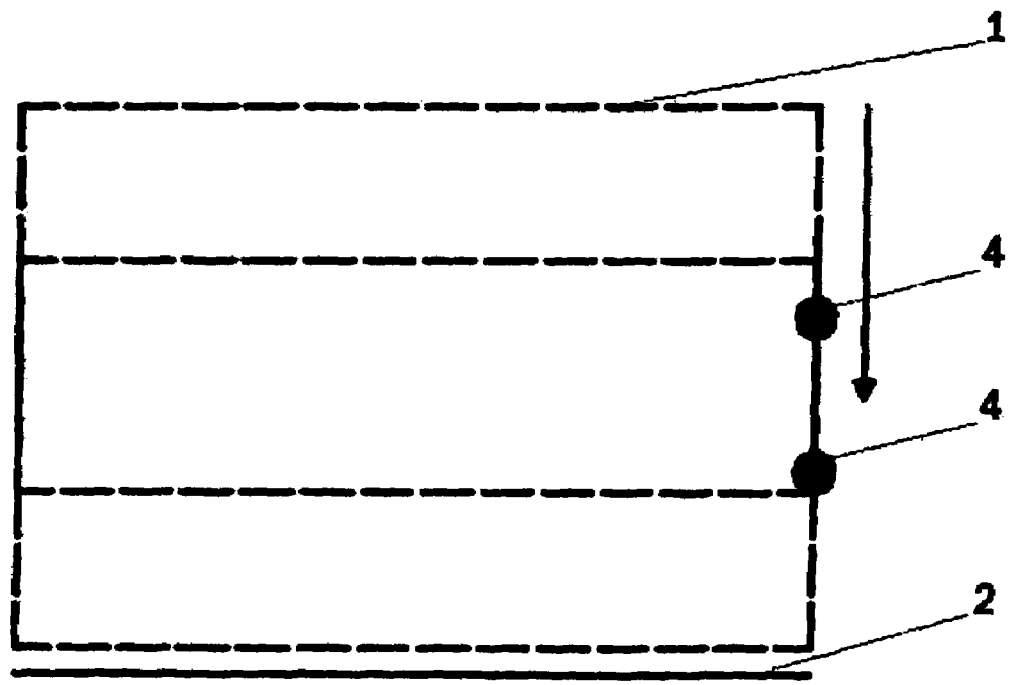
FIG. 2 shows a side view of the functional structure of a pair of electrodes based on translatory motion of an acceleration sensor, according to prior art.

The FIGS. 1-2 are presented above. Below, the invention and preferable methods for its implementation are described with reference to FIGS. 3-12.

DETAILED DESCRIPTION OF THE INVENTION

Figure 3:
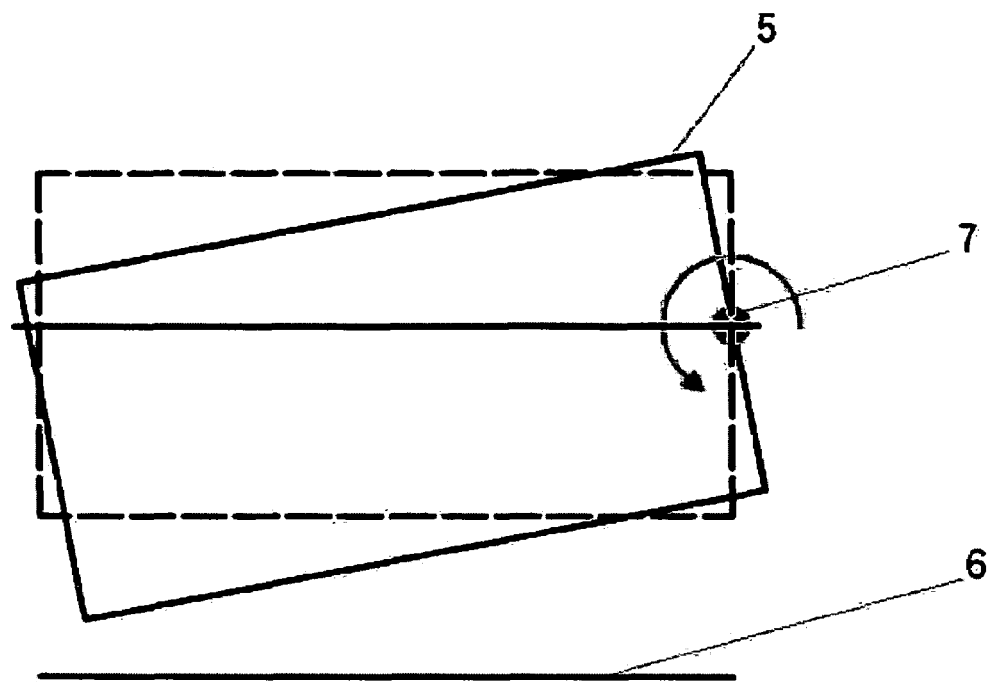
FIG. 3 shows a side view of the functional structure of a pair of electrodes of an acceleration sensor, according to the present invention.

FIG. 3 shows a side view of the functional structure of a pair of electrodes of an acceleration sensor, according to the present invention. A pair of electrodes of the acceleration sensor according to the present invention comprises a movable electrode 5, a stationary electrode 6 and an axis of rotation 7.

The movable electrode 5 of the acceleration sensor is rigidly supported at the axis of rotation 7 such, that the movable electrode 5 is free to rotate in a rotational motion about the axis of rotation 7. The movable electrode 5 in rotational motion constitutes that part of the acceleration sensor, which is responsive to acceleration, which part as a consequence of the acceleration performs rotational motion about the axis of rotation 7.

When, before the rotational motion, the movable electrode 5 of the acceleration sensor is in an upper position, a capacitance is formed between the bottom surface of the movable electrode 5 and the top surface of the stationary electrode 6. The magnitude of the capacitance depends on the area of the surfaces 5, 6, and on the distance between the surfaces 5, 6. When the movable electrode 5 of the acceleration sensor after the rotational motion rotates to a lower position, the capacitance between the surfaces 5, 6 increases, as the distance between the surfaces 5, 6 decreases.

The capacitance between the surfaces of the pair of electrodes of the acceleration sensor according to the present invention is unevenly distributed over the surfaces 5 and 6, since the distance between the surfaces 5, 6 varies. The acceleration sensor according to the present invention may also comprise a second pair of electrodes on the opposite side of the movable electrode 5.

In the acceleration sensor according to the present invention, the change in capacitance of the movable electrode in rotational motion is enhanced by means of the shape of the pair of electrodes in comparison with a pair of electrodes of rectangular shape. The increase in capacitance change is based on the unevenness in electrode distance caused by the rotational motion.

The position of the tip of the movable electrode in rotational motion is the factor, that limits the maximum value of the angle of rotation. Generally, there is a buffer structure on top of the stationary electrode, the pair of electrodes achieving its capacitance maximum, as the movable electrode hits that structure. The most sensitive area regarding the capacitance change is at the tip of the movable electrode, since that is where the distance of the pair of electrodes changes the most.

The maximum value of the angle of rotation depends on the maximum distance of the movable electrode from the axis of rotation, whereas the magnitude of the capacitance formed at the tip of the electrode depends on the width of the pair of electrodes. The capacitance of an unloaded pair of electrodes depends only on the surface of the pair of electrodes.

In the present invention, the pair of electrodes is shaped either by means of the movable electrode, the stationary electrode or both electrodes such, that a significant portion of the area of the pair of electrodes is as far away as possible from the axis of rotational motion at the stationary electrode. Shapes of pairs of electrodes according to the present invention are e.g. triangle-like, drop-like (see, for example, FIG. 12) or hammer-like pairs of electrodes. With the structure according to the present invention the major part of the capacitance generated by the pair of electrodes is generated in the area, where the distance of the pair of electrodes changes greatly.

Figure 4:
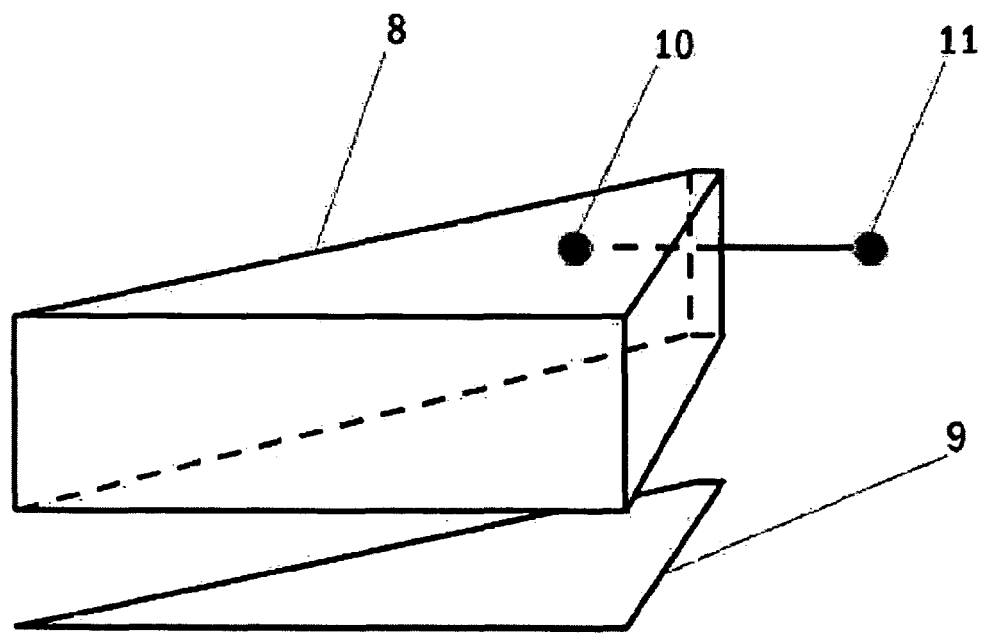
FIG. 4 shows a perspective view of the structure of a pair of electrodes of an acceleration sensor, according to the present invention.

FIG. 4 shows a perspective view of the structure of a pair of electrodes of an acceleration sensor according to the present invention. The pair of electrodes of the acceleration sensor according to the present invention comprises a designed movable electrode 8, which moves according to the acceleration, and a designed stationary electrode 9. The movable electrode 8 constitutes that part 8 of the acceleration sensor, which is responsive to the acceleration, and which part, in consequence of the acceleration, moves in relation to the plate portion 9. The movable electrode 8 and the stationary electrode 9 form a pair of electrodes converting acceleration into an electrically measurable quantity, i.e. capacitance. In the Figure, the movable electrode 8 of the acceleration sensor is supported at points 10 and 11 of an axis of rotation.

Alternative shapes for the pairs of electrodes are, for example, triangle-like, drop-like or hammer-like pairs of electrodes. With a structure like this, the major part of the capacitance generated by the pair of electrodes is generated at the area, where the distance of the pair of electrodes changes greatly.

Figure 5:
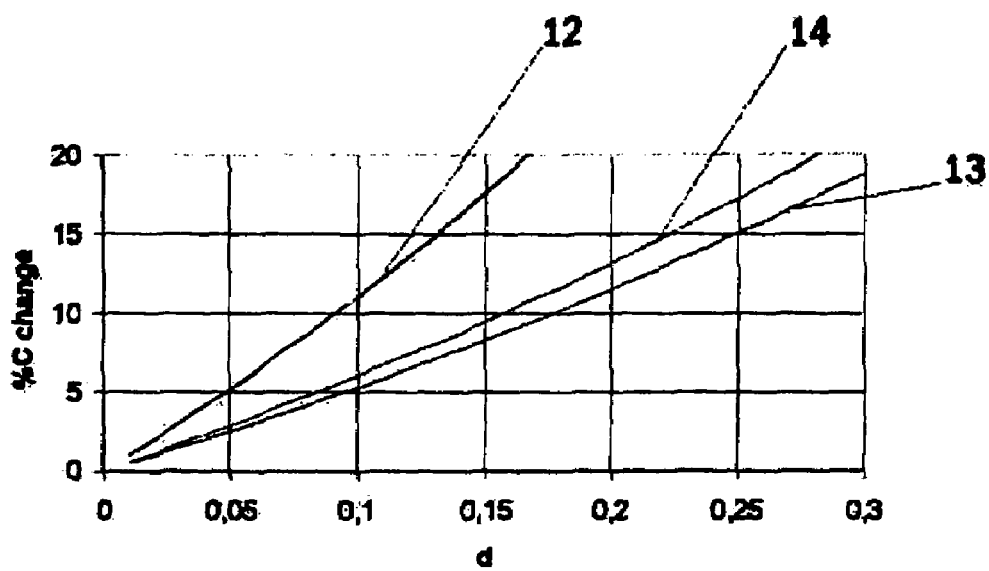
FIG. 5 shows the change, expressed in percentages, in the capacitance of a pair of electrodes of an acceleration sensor, according to the present invention, as the distance between the surfaces of the pair of electrodes varies.

FIG. 5 shows the change, expressed in percentages, in the capacitance of a pair of electrodes of an acceleration sensor according to the present invention, as the distance between the surfaces of the pair of electrodes varies. The horizontal axis shows the distance (d) between the surfaces of the pair of electrodes. Correspondingly, the vertical axis shows the change, expressed in percentages, in the capacitance of the pair of electrodes (% C change). The curve 12 depicts the change, expressed in percentages, in the capacitance of an ordinary pair of electrodes, having surfaces of rectangular shape moving in translatory motion, as the distance between the surfaces of the pair of electrodes varies. The curve 13, respectively, depicts the change, expressed in percentages, in the capacitance of a pair of electrodes with surfaces of rectangular shape moving in rotational motion as the distance between the surfaces of the pair of electrodes varies.

Thus, it can be seen, that the change in capacitance of the pair of electrodes moving in a rotational motion, used in the measuring, is not equally large as in the case of the ordinary pair of electrodes with surfaces of rectangular shape moving in translatory motion. This change sensitivity needed for the measuring can be compensated by shaping the pair of electrodes. The curve 14 depicts the change, expressed in percentages, in the capacitance of a pair of electrodes with surfaces of triangular shape moving in rotational motion as the distance between the surfaces of the pair of electrodes varies.

The movable electrode of the pair of electrodes of the acceleration sensor according to the present invention has essentially two points of support with related springs providing a degree of freedom of rotation for the movable electrode about a straight line drawn through the points of support.

The movable electrodes can be limited to those having a direction of sensitivity to acceleration, which is not parallel to the electrode plane. Here, the electrode plane is understood to mean a plane of the electrode formed by the least squares method. Thus, the center of gravity of the movable electrode projected in a direction perpendicular to the electrode plane of the movable electrode onto a plane parallel to the electrode plane of the movable electrode, which plane parallel to the electrode plane of the movable electrode passes through the points of support of the movable electrode, said projected movable electrode must not lie on the straight line drawn between the points of support of the movable electrode.

A multitude of pairs of electrodes can be used in the acceleration sensor according to the present invention. Thus, acceleration can be measured in relation to several different axes. The positioning of the pairs of electrodes is selected to be symmetrical in relation to an axis of symmetry, whereby the behavior of the pairs of electrodes, when subjected to temperature stress or other symmetrical load, will be equal.

The shape of the pairs of electrodes of the acceleration sensor is selected to suit the number of pairs of electrodes, whereby an optimal packing density is achieved by utilizing the shapes and positioning of the mass items. The support arrangements of the movable electrode of the pair of electrodes of the acceleration sensor according to the present invention and the structure of the electrodes are described in more detail in the Applicant's co-pending international patent application.

Figure 6:
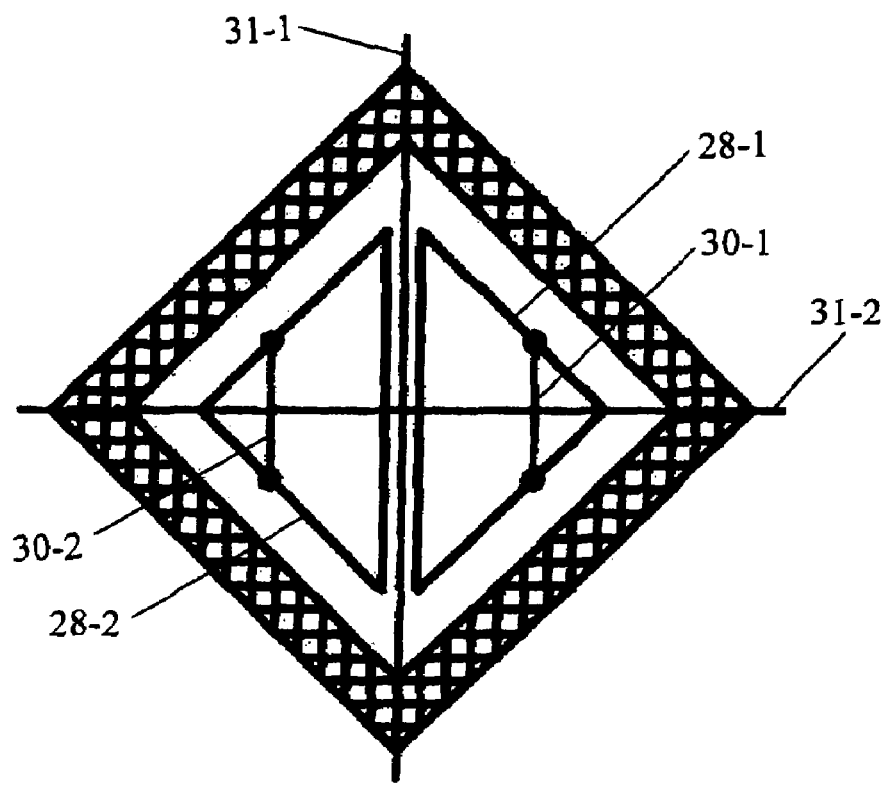
FIG. 6 shows an acceleration sensor according to the present invention, implemented with two pairs of electrodes.

FIG. 6 shows an acceleration sensor, according to the present invention, implemented with two pairs of electrodes. In the Figure, in addition to the triangular movable electrodes 28-1 and 28-2, the axes of symmetry 31-1 and 3 1-2, the spring an achment points, the axes of rotation 30-1 and 30-2 and the outer wall of the sensor are indicated. By using multiple pairs of electrodes and by suitably selecting the points of support, an acceleration sensor with alternatively one or two axes can be implemented. In the Figure, an acceleration sensor with two axes has been implemented using two pairs of electrodes. The pairs of electrodes are positioned such, that two axis of symmetry are obtained. In the acceleration sensor according to the present invention, the center of gravity of each movable electrode and the length of the line segment between the centers of gravity must be shorter than the straight line drawn between any support points of the different movable electrodes.

Figure 7:
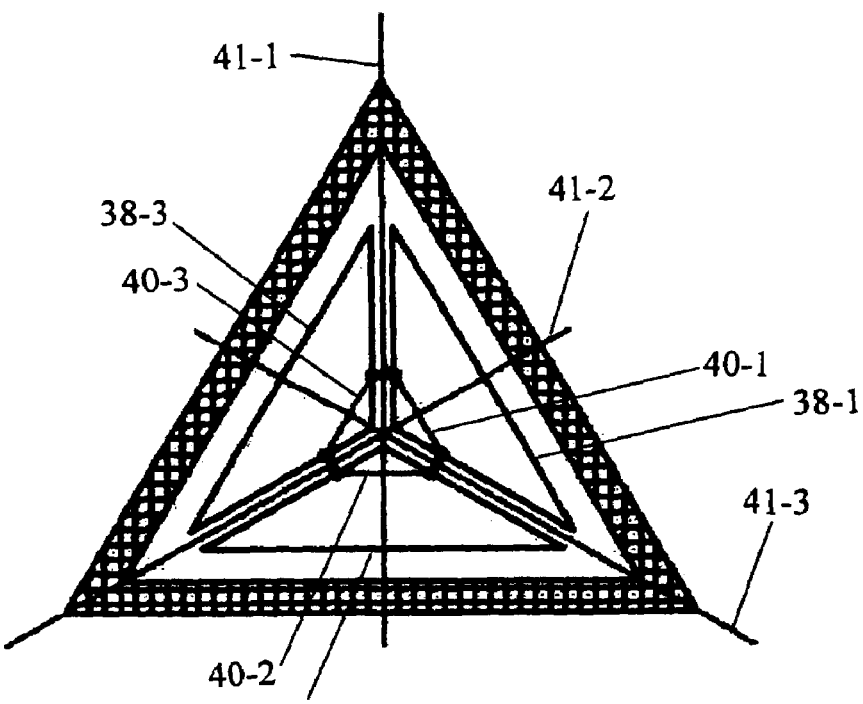
FIG. 7 shows an acceleration sensor according to the present invention, implemented with three pairs of electrodes.

FIG. 7 shows an acceleration sensor, according to the present invention, implemented with three pairs of electrodes. In the Figure, in addition to the triangular movable electrodes 38-1, 38-2 and 38-3, the axes of symmetry 41-1, 41-2 and 41-3, the spring attachment points, the axes of rotation 40-1, 40-2 and 40-3 and the outer wall of the sensor are indicated. By using multiple pairs of electrodes and by suitably selecting the points of support, an acceleration sensor with alternatively one, two or three axes can be implemented. In the Figure, an acceleration sensor with three axes has been implemented using three pairs of electrodes. The pairs of electrodes are positioned such, that three axis of symmetry are obtained. In the acceleration sensor according to the present invention, the positive direction is understood to be the direction from the support axis of the movable electrode towards the center of gravity, and the negative direction is understood to be the direction opposite to that. In the acceleration sensor according to the present invention, the pairs of electrodes are located in the sensor such, that the positive direction vector of each movable electrode is at an angle of 120°, and 240° in relation to the positive direction vector of the other two movable electrodes, and that the negative direction vectors of the movable electrodes intersect in essentially a single point.

Figure 8:
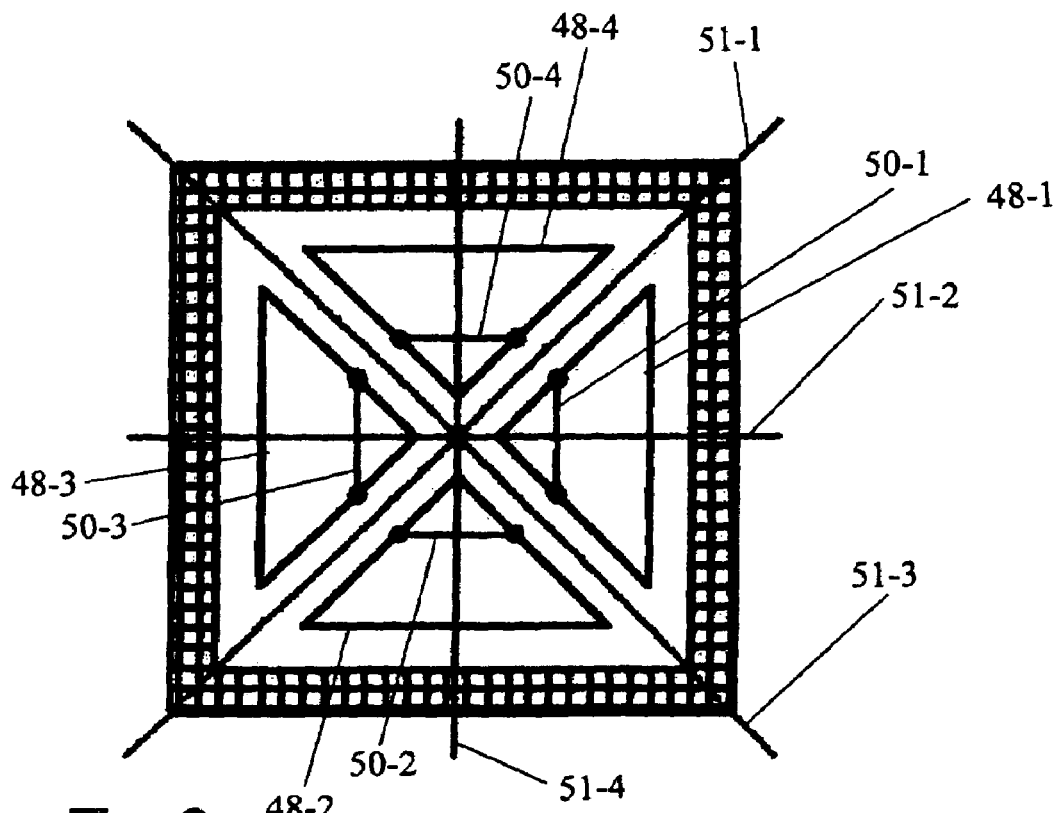
FIG. 8 shows an acceleration sensor according to the present invention, implemented with four pairs of electrodes.

FIG. 8 shows an acceleration sensor, according to the present invention, implemented with four pairs of electrodes. In the Figure, in addition to the triangular movable electrodes 48-1, 48-2, 48-3 and 48-4, the axes of symmetry 51-1, 51-2, 51-3 and 51-4, the spring attachment points, the axes of rotation 50-1, 50-2, 50-3 and 50-4 and the outer wall of the sensor are indicated. By using multiple pairs of electrodes and by suitably selecting the points of support, an acceleration sensor with alternatively one, two or three axes can be implemented. In the Figure, an acceleration sensor with three axes has been implemented using four pairs of electrodes. The pairs of electrodes are positioned such, that four axis of symmetry are obtained. In the acceleration sensor according to the present invention, the pairs of electrodes are located in the sensor such, that the positive direction vector of each movable electrode is at an angle of 90°, 180°, and 270° in relation to the positive direction vector of the other three movable electrodes, and that the negative direction vectors of the movable electrodes intersect in essentially a single point.

Figure 9:
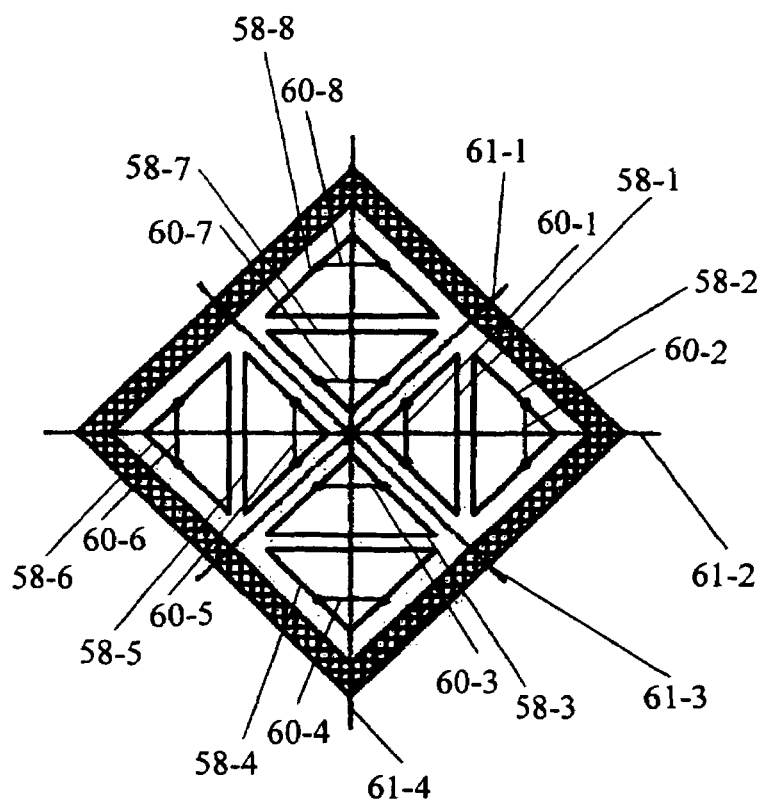
FIG. 9 shows an acceleration sensor according to the present invention, implemented with eight pairs of electrodes.

FIG. 9 shows an acceleration sensor, according to the present invention, implemented with eight pairs of electrodes. In the Figure, in addition to the triangular movable electrodes 58-1, 58-2, 58-3, 58-4, 58-5, 58-6, 58-7 and 58-8, the axes of symmetry 61-1, 61-2, 61-3 and 61-4, the spring attachment points, the axes of rotation 60-1, 60-2, 60-3, 60-4, 60-5, 60-6, 60-7 and 60-8 and the outer wall of the sensor are indicated. By using multiple pairs of electrodes and by suitably selecting the points of support, an acceleration sensor with alternatively one, two or three axes can be implemented. In the Figure, an acceleration sensor with three axes has been implemented using eight pairs of electrodes. The pairs of electrodes are positioned such, that four axis of symmetry are obtained.

Different ranges of acceleration can be measured with the different pairs of electrodes of the acceleration sensor according to the present invention. Some pairs of electrodes of the acceleration sensor may also be redundant pairs of electrodes. In addition, some of the pairs of electrodes of the acceleration sensor can be used for linearisation of the capacitance change.

Figure 10:
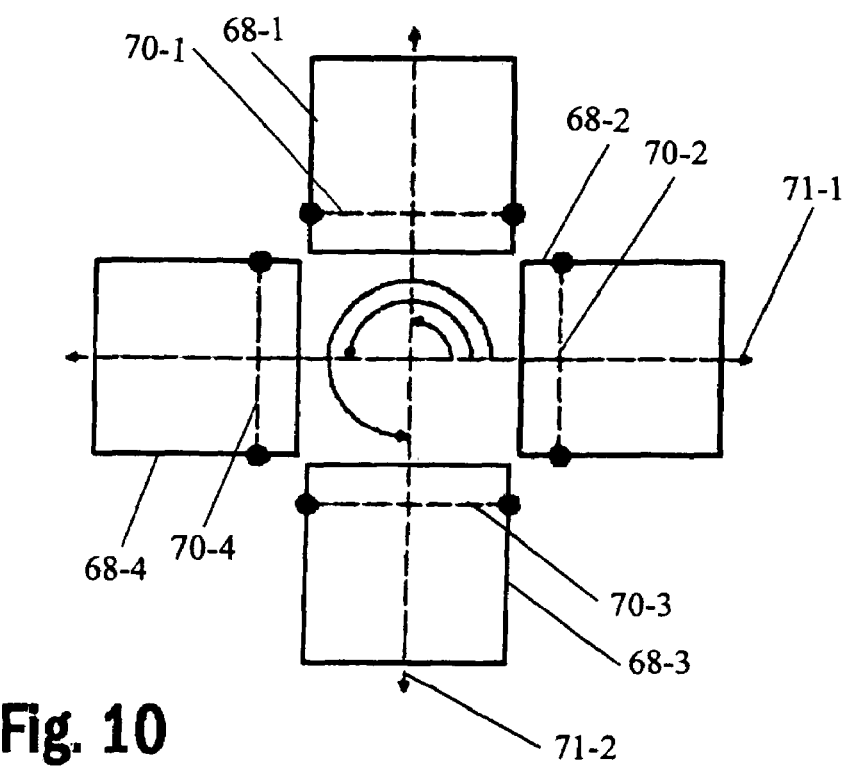
FIG. 10 shows an alternative acceleration sensor according to the present invention, implemented with four pairs of electrodes.

FIG. 10 shows an alternative acceleration sensor, according to the present invention, implemented with four pairs of electrodes 68-1, 68-2, 68-3 and 68-4. In the Figure, in addition to the triangular movable electrodes, the axes of symmetry 71-1 and 71-2, and the axes of rotation 70-1, 70-2, 70-3 and 70-4 are indicated. In the alternative acceleration sensor according to the present invention the pairs of electrodes are located in the sensor such, that the positive direction vector of each movable electrode is at an angle of 90°, 180°, and 270° in relation to the positive direction vector of the other three movable electrodes, and that the negative direction vectors of the movable electrodes intersect in essentially a single point in the center of the assembly. The electrode planes and support points of the movable electrodes are symmetrical in relation to four axes of symmetry in the electrode plane.

Figure 11:
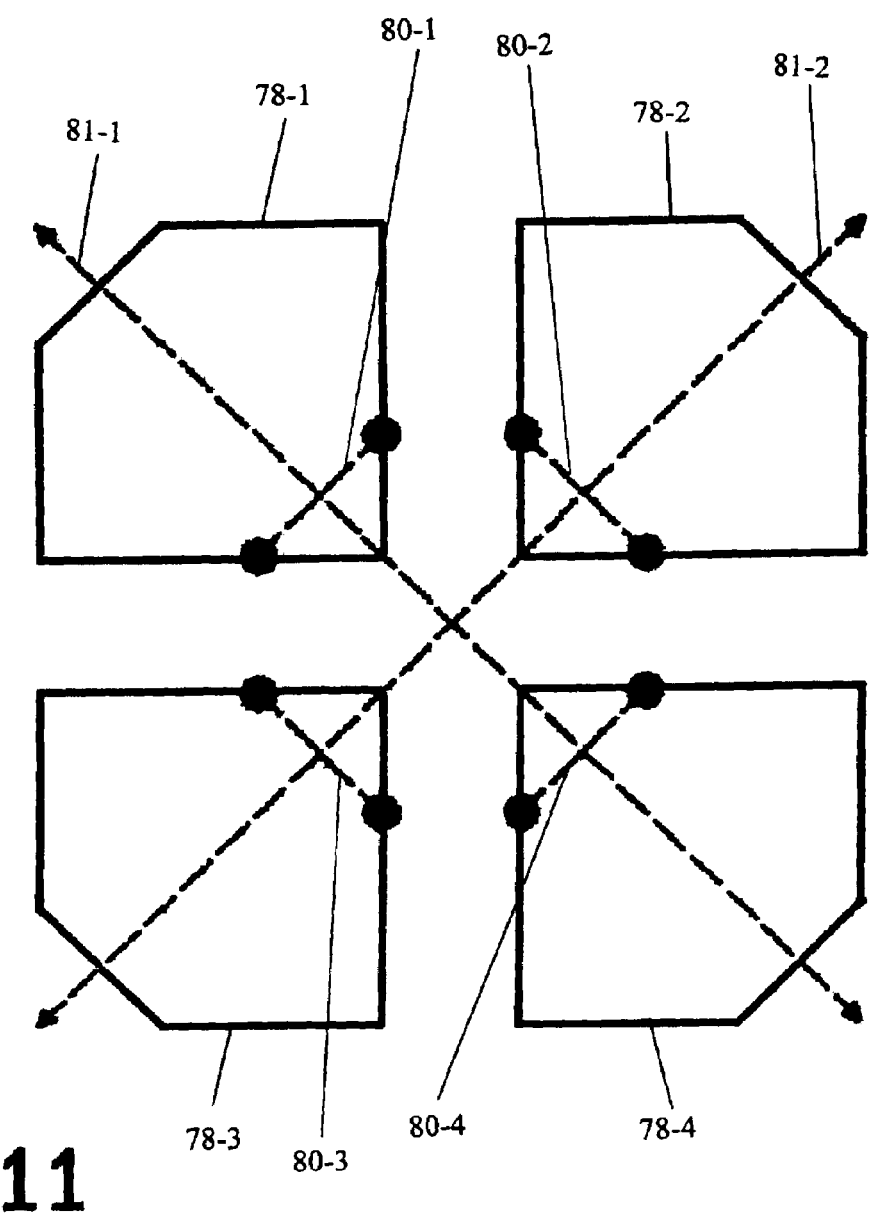
FIG. 11 shows a second alternative acceleration sensor according to the present invention, implemented with four pairs of electrodes.
Figure 12:
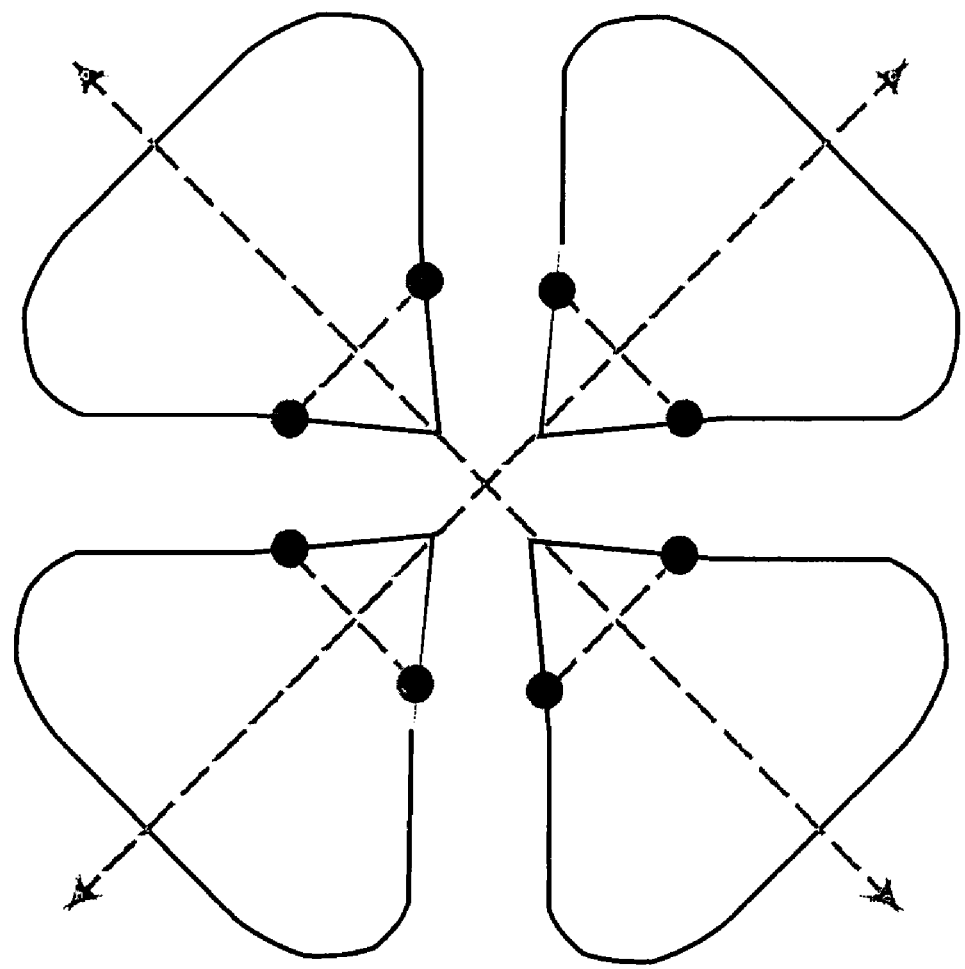
FIG. 12 illustrates drop like pairs of electrodes.

FIG. 11 shows a second alternative acceleration sensor, according to the present invention, implemented with four pairs of electrodes. In the Figure, in addition to the movable electrodes 78-1, 78-2, 78-3 and 78-4, the axes of symmetry 81-1 and 81-2, and the axes of rotation 80-1, 80-2, 80-3 and 80-4 are indicated. In the second alternative acceleration sensor according to the present invention, the pairs of electrodes are located in the sensor such, that the positive direction vector of each movable electrode is at an angle of 90°, 180°, and 270° in relation to the positive direction vector of the other three movable electrodes, and that the negative direction vectors of the movable electrodes intersect in essentially a single point in the center of the assembly. The electrode planes and support points of the movable electrodes are symmetrical in relation to four axes of symmetry in the electrode plane.

Advantages of symmetry are achieved with an acceleration sensor according to the present invention, and it enables reliable and efficient measuring of acceleration, in particular in small capacitive acceleration sensor designs.

The invention claimed is:

1. A capacitive acceleration sensor, comprising:
   a pair of electrodes comprising
      a movable electrode that is responsive to acceleration,
      at least one stationary plate portion, and
      an axis of rotation,
   wherein the movable electrode is supported by springs such that the movable electrode is rigidly supported at the axis of rotation and is free to rotate about the axis of rotation; and
   said capacitive acceleration sensor further comprising at least three additional pairs of electrodes,
      wherein the at least three additional pairs of electrodes are of similar structure to the pair of electrodes,
   wherein the position of the pairs of electrodes are arranged symmetrically with respect to at least two additional pairs of electrodes;
   wherein the at least three additional pairs of electrodes and the pair of electrodes are configured to together provide multi-axis acceleration sensing using capacitive principles, and
   wherein negative direction vectors of at least four movable electrodes intersect at essentially one point.

2. The capacitive acceleration sensor of claim 1, wherein a shape of the pair of electrodes comprises at least one of triangle-like or drop-like pairs of electrodes.

3. The capacitive acceleration sensor of claim 1, wherein only four pairs of electrodes are used in the acceleration sensor.

4. The capacitive acceleration sensor of claim 3, wherein the sensor is configured to sense acceleration in two axes.

5. The capacitive acceleration sensor of claim 3, wherein the sensor is configured to sense acceleration in three axes.

6. The capacitive acceleration sensor of claim 3, wherein the only four pairs of electrodes are positioned to form four different axes of symmetry.

7. The capacitive acceleration sensor of claim 3, wherein the only four pairs of electrodes are configured such that a positive direction vector of the movable electrode of each pair of the only four pairs of electrodes is at an angle of 90°, 180°, and 270° in relation to a positive direction vector of the other three movable electrodes.

8. The capacitive acceleration sensor of claim 1, wherein only eight pairs of electrodes are used in the acceleration sensor.

9. The capacitive acceleration sensor of claim 8, wherein the sensor is configured to sense acceleration in two axes.

10. The capacitive acceleration sensor of claim 8, wherein the sensor is configured to sense acceleration in three axes.

11. The capacitive acceleration sensor of claim 8, wherein the eight pairs of electrodes are positioned to form four different axes of symmetry.

12. The capacitive, acceleration sensor of claim 1, wherein different pairs of electrodes of the pair of electrodes and the at least three additional pairs of electrodes are configured to measure different ranges of acceleration.

13. The capacitive acceleration sensor of claim 1, wherein some pairs of electrodes of the pair of electrodes and the at least three additional pairs of electrodes of the acceleration sensor are redundant.

* * * * *